US006968079B2

(12) United States Patent
Yoshikawa et al.

(10) Patent No.: US 6,968,079 B2
(45) Date of Patent: Nov. 22, 2005

(54) INVESTIGATION DEVICE AND INVESTIGATION METHOD

(75) Inventors: Akira Yoshikawa, Kawagoe (JP);
Kazuhisa Machida, Kawasaki (JP);
Hitoshi Komuro, Hitachinaka (JP);
Takehiro Hirai, Hitachinaka (JP);
Katsuhiro Kitahashi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 659 days.

(21) Appl. No.: 09/886,976

(22) Filed: Jun. 25, 2001

(65) Prior Publication Data

US 2002/0001404 A1  Jan. 3, 2002

(30) Foreign Application Priority Data

Jun. 28, 2000 (JP) ............................. 2000-195128

(51) Int. Cl.[7] .............................................. G06K 9/00
(52) U.S. Cl. ...................... 382/145; 702/35; 356/237.4
(58) Field of Search ................................ 382/144, 145, 382/147, 148, 149, 151; 348/87, 94, 95, 126, 348/129, 130; 356/390, 394, 237.4, 237.5; 438/7, 16; 250/559.39, 559.45, 559.46

(56) References Cited

U.S. PATENT DOCUMENTS 6,480,279 B2 * 11/2002 Nara et al. .................. 356/394

FOREIGN PATENT DOCUMENTS

| JP | 821803 | 1/1996 | | |
|----|--------|--------|---|---|
| JP | 11344450 | 12/1999 | | |
| JP | 200057349 | 2/2000 | | |
| JP | 200097871 | 4/2000 | | |
| JP | 2000-161932 | * | 6/2000 | |
| JP | 2000-161948 | * | 6/2000 | |
| JP | 2000-162143 | * | 6/2000 | |
| JP | 2000-164661 | * | 6/2000 | |

OTHER PUBLICATIONS

Semiconductor World, 1996, 8 Issue, pp. 88 to 91 and 99 to 105.

* cited by examiner

Primary Examiner—Samir Ahmed
(74) Attorney, Agent, or Firm—Mattingly, Stanger, Malur & Brundidge, P.C.

(57) ABSTRACT

The present invention relates to an inspection device and inspection method of a specimen, particularly to the inspection device and inspection method of defects of semiconductor wafers, and the object is to cope with the increase of inspection images and provide an inspection device and inspection method which is capable of classification by sub class, meeting the user needs, in addition to the automatic classification by an inspection device.

To achieve the afore-mentioned object, the present invention provides an inspection device, comprising a storage means for storing the images obtained and a display means equipped with the first display area for displaying multiple images stored in the storage means and the second display area for displaying the images which are classified according to the characteristics of the displayed images (called the classified images), wherein the display means displays the class of the specimen, displays the sub class which is set manually for each class, and also displays the images selected by the sub class as a mass of the classified images for each sub class.

10 Claims, 10 Drawing Sheets

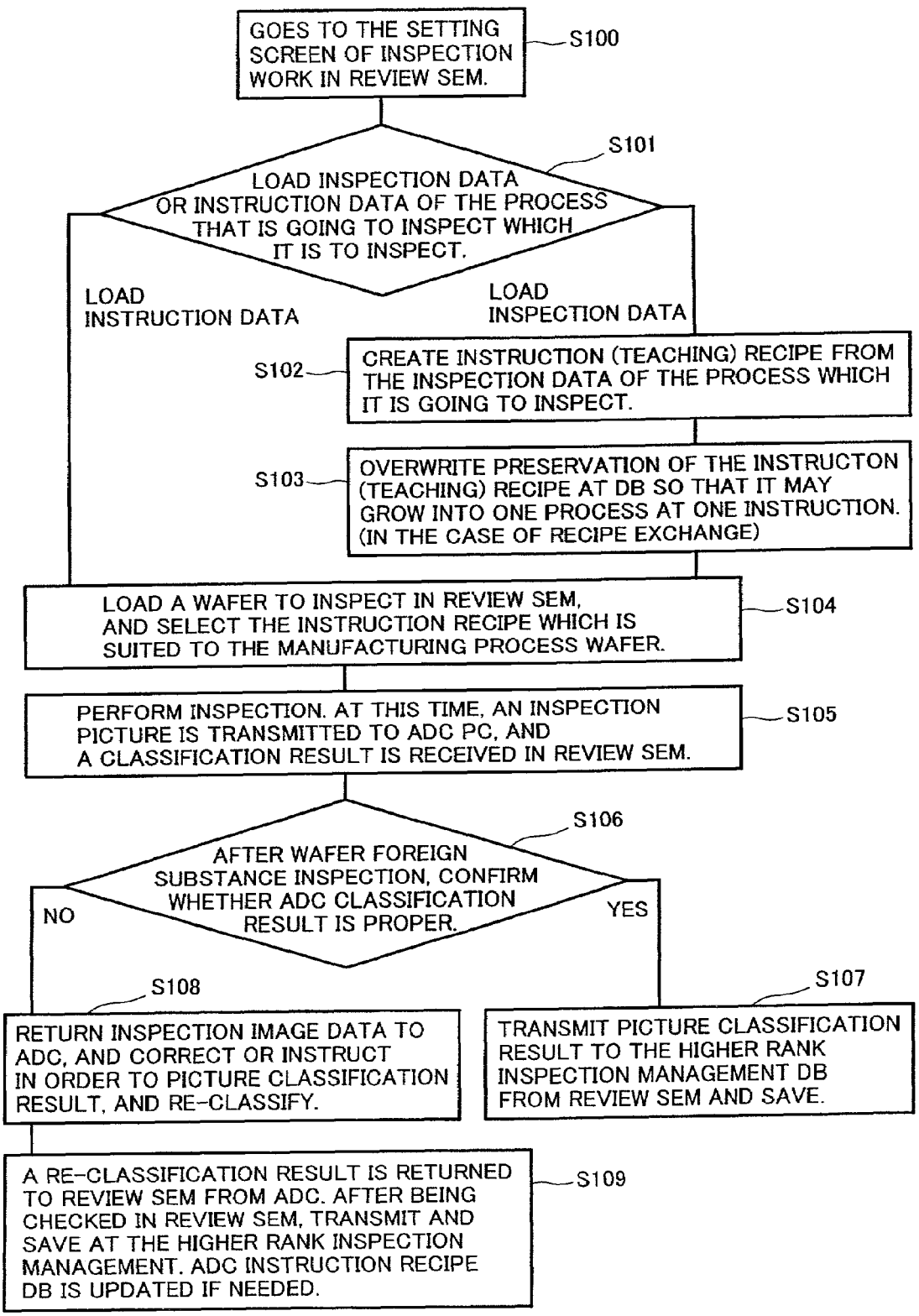

INVESTIGATION DEVICE AND INVESTIGATION METHOD

BACKGROUND OF THE INVENTION

In manufacturing semiconductors, the silicone wafers undergo in-process checks, including foreign substance inspection, visual inspection, and SEM inspection, in each process such as exposure and etching. The inspection images obtained through these inspections are classified and analyzed by size, shape and location of the foreign substance causing a defect and the result is utilized to improve the yield.

A method of classifying these images automatically by characteristics is disclosed in Japanese application patent laid-open publication No. Hei 08-21803. With this method, a classification reference image called "teaching image data" is provided and the images are classified according to this reference image automatically. To be concrete, the Publication covers a defect type judgment device for judging the type of individual defect found through a defect inspection of a specimen; wherein said device is equipped with a neuro-processing unit which converts an input pattern into an optional output pattern; said neuro-processing unit has been so taught that an output pattern representing an optional defect type is displayed for each defect information of the input pattern corresponding to each defect type; the defect information of the defect found through the defect inspection is input into the neuro-processing unit; and the defect type is determined in accordance with the output pattern from the unit.

Electronic devices, typically semiconductors are made through multiple processes, including exposure, development and etching on a wafer, to form a substrate. For a wafer worked in one of those multiple processes, information about the location, size, quantity, type, etc. of the foreign substance (hereinafter called the defect) collected on the wafer and information about the processing size of the workpiece are obtained, as needed, by a foreign substance inspection device, visual inspection device and/or SEM inspection device. It is reported on pages 88, 99 and 102 of 1996.8 issue of the monthly Semiconductor World that all inspection data are generally sent to an analyzing system via a network and managed and analyzed by the system.

In some processes, defect images are obtained using an electronic microscope and the actual shape and size of the defect are classified so as to identify the cause of the defect. This classification is done visually on the display of a personal computer, where the obtained defect images are classified into groups of similar defect by size, shape, and so on. The defect images are obtained at several points on each wafer, which number of points is determined manually making reference to the distribution or wafer map of the defect in the pre-process, or hundreds of defect images are obtained in an hour by the ADR (Automatic Defect Review) function. In either case, the number of images to be obtained tends to increase.

In the selection procedure of the "teaching image data" (hereinafter called the instruction), user strongly wants to set the data for himself in accordance with his own manufacturing line and/or criteria. In other words, it is required that the classification by sub class, which is unique to each user, is made possible in addition to the automatic classification based on the instruction by an inspection device as shown in the afore-mentioned disclosed patent.

As the inspection data volume has increased, the selection procedure of the "teaching image data" has become important to maintain accurate analysis of the inspection images. Besides, the review itself of a vast amount of the inspection image data has become tough to the user. Both maintenance of the analytical accuracy of the inspection images and increase of the review speed have become essential to improve the production efficiency.

SUMMARY OF THE INVENTION

The present invention relates to an inspection device and inspection method, particularly to the inspection device and inspection method of semiconductor wafers, and provides an inspection device and inspection method which is capable of classification by sub class, meeting the user needs, in addition to the automatic classification by an inspection device.

An object of the present invention is to provide an inspection device and inspection method which copes with the increase of inspection images and is capable of classification by sub class in addition to the automatic classification by an inspection device in order to meet the user needs.

The present invention is further capable of reviewing a vast amount of inspection image data and analyzing as much as about 70%, preferably 90% of the images in the classification work in case any defect is found so as to increase the analysis efficiency and improve the production efficiency.

The present invention achieves the afore-mentioned objects by means of the device and method described hereunder.

The present invention provides an inspection device, comprising a storage means for storing the images obtained and a display means equipped with the first display area for displaying multiple images stored in the storage means and the second display area for displaying the images which are classified according to the characteristics of the displayed images (called the classified images), wherein the display means displays the class of the specimen, displays the sub class which is set manually for each class, and also displays the images selected by the sub class as a mass of the classified images for each sub class.

The classified images can be grouped and displayed for each common sub class.

Besides, the classified images can be compared with the confirmation image of the instruction and the result be displayed as a list, and also the sub class of the classified images can be changed and the result be displayed again.

It is permissible that the display means is also equipped with the third display area for displaying the right, left and front enlarged images of the specimen of an image selected from the displayed images.

In the third display area, the obtained images can be displayed as a mass of points in time series and, at the same time, correlation with the multiple images displayed in the first display area can be displayed in the mass for recognition.

The present invention provides an inspection method which obtains images of a specimen and stores the images, displays the multiple stored images in the first display area, and displays the classified images which are classified according to the characteristics of the displayed images in the second display area, wherein the class of the specimen is displayed automatically, sub class is set manually for each class and displayed, and the images selected by the sub class are displayed as a mass of the classified images for each sub class.

It is possible that an image is selected from the displayed images and the right, left and front enlarged images of the specimen are displayed for the selected image.

It is possible that the specimen represents a semiconductor wafer, the class represents the defect classification of the semiconductor wafer and 2 to 5 common characteristics specific to the semiconductor wafer are set as the class, and the result of the classification by the class is statistically processed for each sub class.

The present invention provides an inspection method which obtains images of a specimen and stores the images, displays the multiple stored images in the first display area, and displays the classified images which are classified according to the characteristics of the displayed images in the second display area, wherein the class of the specimen is displayed automatically, the images are displayed in the number of more than 6×6 but less than 9×9 in the first display area, sub class is set manually for each class and displayed, and the images selected by the sub class are displayed in the number of 4 to 6 as the classified images for each sub class.

BRIEF DESCRIPTION OF THE DRAWINGS

FIG. 12 is a flowchart.

DETAILED DESCRIPTION OF THE PRESENT INVENTION

An embodiment according to the present invention is explained hereunder, using the attached figures.

Figure 1:
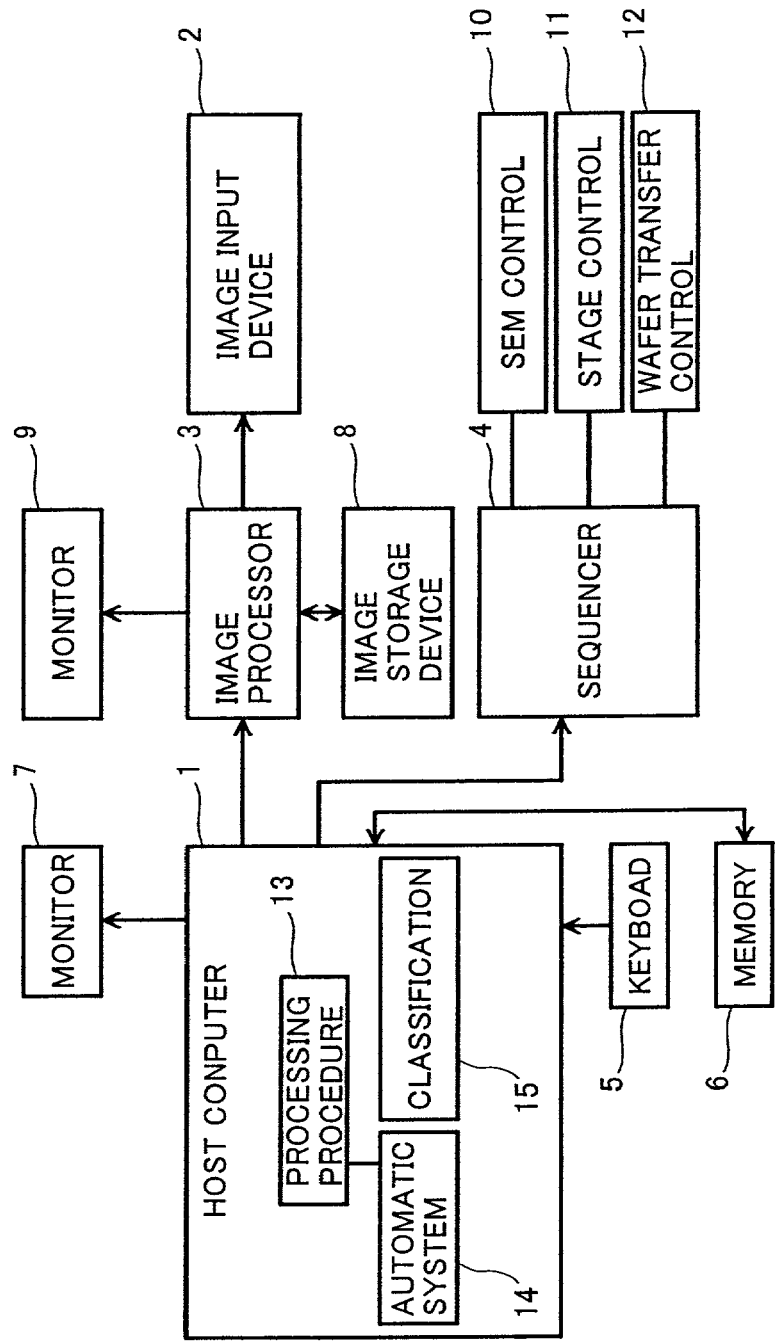
FIG. 1 is a system block diagram showing the outline of the embodiment of the present invention.

FIG. 1 is a diagram showing the function blocks of a system which performs the defect inspection of a specimen. This embodiment comprises a host computer 1, image input device 2, image processor 3, sequencer 4, and so on.

The image input device 2 is equipped with a lighting optical system, comprising an interference optical system, diffraction optical system, slanted lighting optical system, etc., and a photo-taking optical system for forming an inspection image of the specimen on a photo-taking element like CCD. The image of the specimen is taken into the system by the image input device 2.

The image processor 3, connected to the image input device 2, is equipped with an image processing function that extracts defects of the specimen (for example, uneven coating, foreign substance, and dust) from the inputted inspection image and detects the type, quantity, location, area, etc. of the extracted defects. These inspection items comprise part of the defect information explained later. An image storage device 8 and TV monitor 9 are connected to the image processor 3.

The host computer 1, while managing the operation of the whole system, processes in a processing procedure 13 the defect information inputted from the image processor 3 and instructs the image processor 3 to perform automatic classification 14 and automatic system classification 15. The host computer 1 has a function for storing the outputted defect names successively and anticipating occurrence of defects. A TV monitor 7, keyboard 5, and memory 6 are connected to the host computer 1. In the memory 6, the inspection conditions (optical system setting conditions and image processing conditions) and inspection data are stored for each type of the specimen.

The sequencer 4, to which a SEM control 10, stage control 11, and wafer transfer control 12 are connected, controls these control functions by the instruction from the host computer 1.

Figure 2:
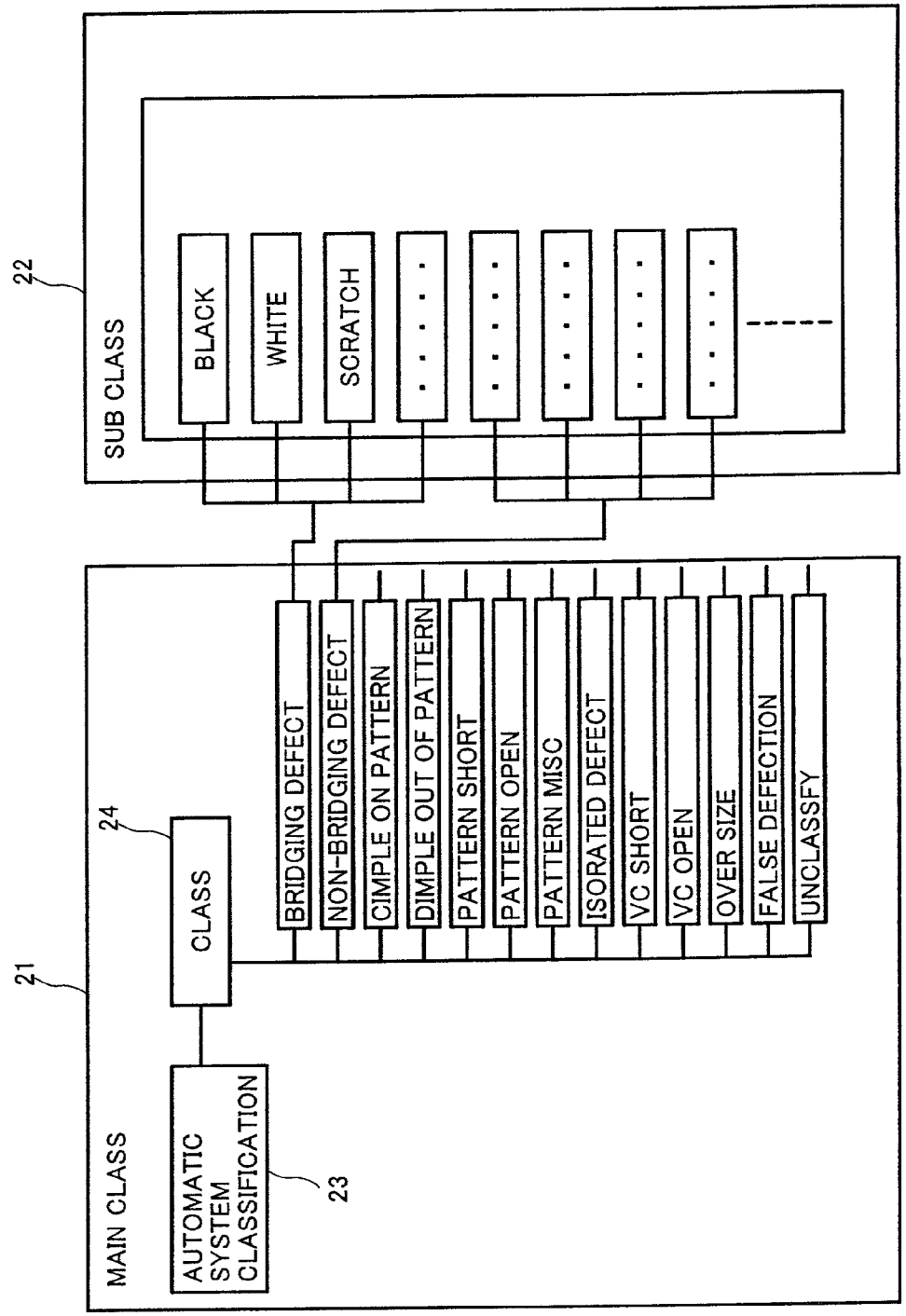
FIG. 2 is a diagram explaining the classification.

FIG. 2 shows the classification of the images by the main class and by the sub class. The classification by the main class 21 is processed automatically in the host computer 1 and displayed on a monitor 9, i.e. display screen, via the image processor 3. The sub class 22 is set manually. The user, following the instruction, operates the device to classify by the manually set class and the images selected in accordance with the class are displayed on the screen as a sum of the classified images for each sub class. Automatic system classification 23 is performed in the main class 21, and the figure shows 13 classes as class 24. They are: bridging defect, non-bridging defect, dimple on pattern, dimple out of pattern, pattern short, pattern open, pattern misc., isolated defect, VC short, VC open, over-size, false defection, and unclassify.

The sub class is set manually on the screen and the selected images are classified and displayed on the screen. For example, the sub class of the bridging defect is set using items unique to each user, such as "black", "white", and "scratch", in a tree structure and displayed on the screen, where the selected images can be further classified and the result be displayed on the screen as a sum of the classified images. Employment of the system or method as above provides an inspection method that is easy to use and suitable for each user. For this reason, the inspection device is provided with wide usability for the classification by the sub class as above. For the bridging defect, a similar or common sub class can be set manually. The number of user classes shall be 2 to 5, more preferably 4 or 5. For other main classes, the user can set sub classes optionally and the classified images meeting the user requirement can be displayed.

Next, the image processor and display on the screen are explained hereunder.

Figure 3:
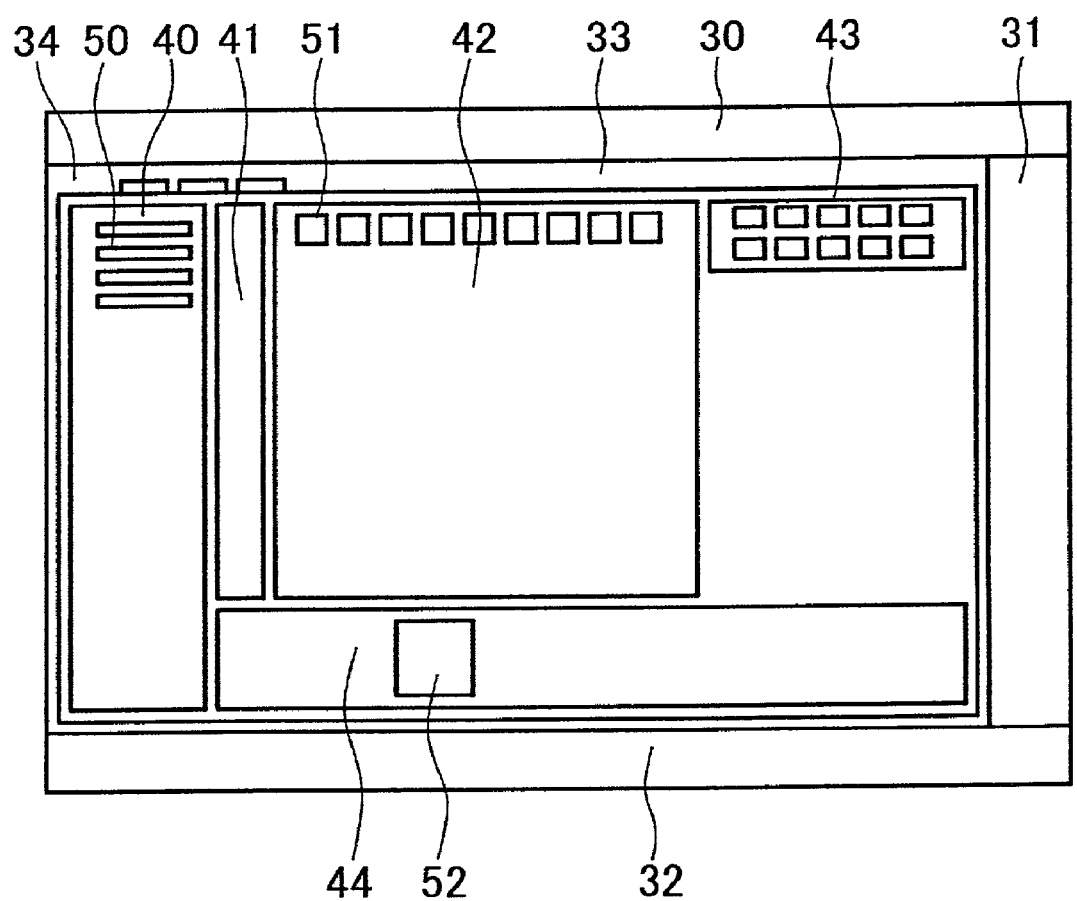
FIG. 3 shows the composition of the display.
Figures 4A, 4B, 4C:
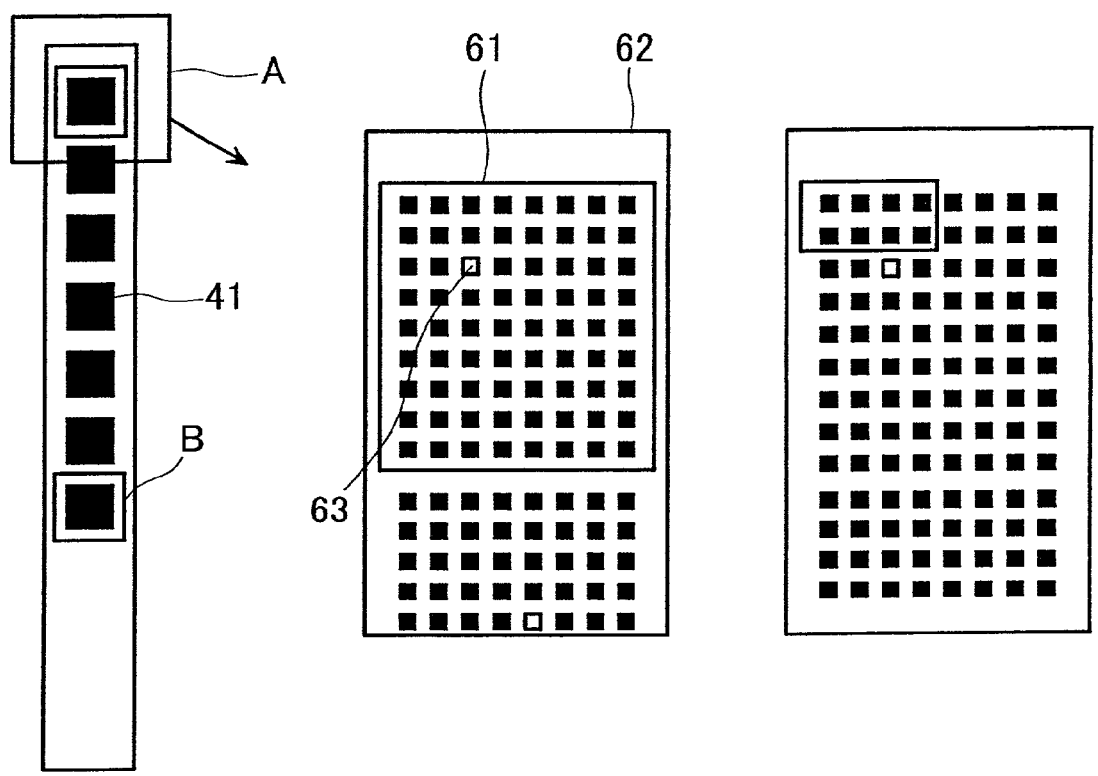
FIG. 4 is the detailed view of a part of the screen in FIG. 3.
Figure 5:
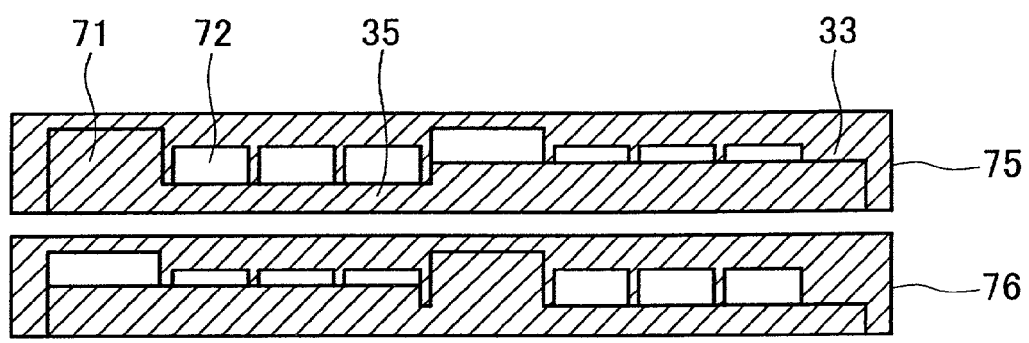
FIG. 5 is the detailed view of a part of the screen in FIG. 3.
Figure 6:
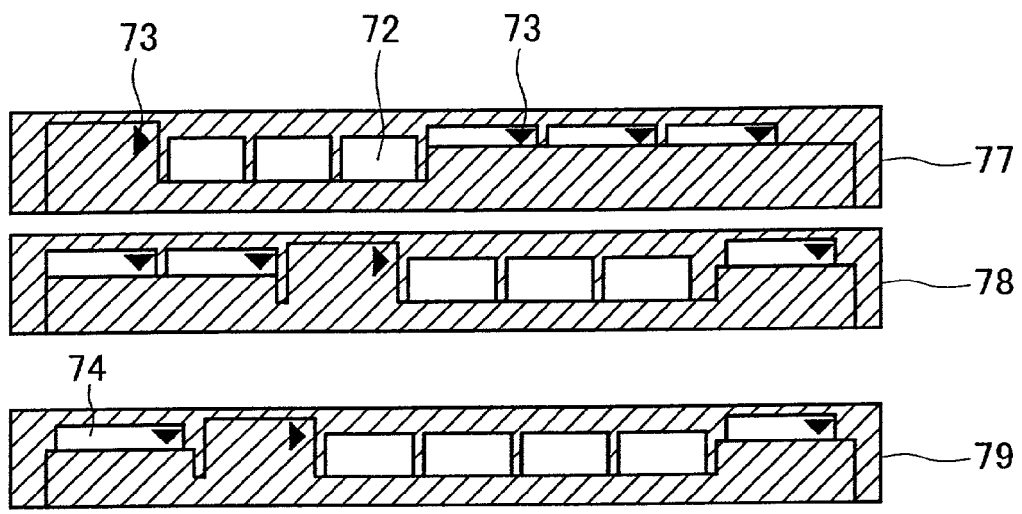
FIG. 6 is the detailed view of another part of the screen in FIG. 3.
Figure 7:
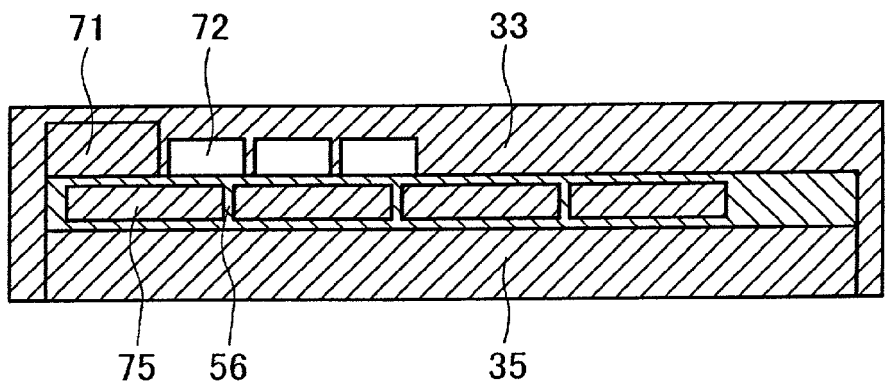
FIG. 7 is the detailed view of another part of the screen in FIG. 3.

FIG. 3 shows a screen where the images for specifying the characteristics necessary for the automatic classification are specified and selected to be taught into the classification folders by the user under the ADC (teaching image data) inspection image classification software. This is called the teaching of the instruction images. FIG. 4 shows the detail of the map image area for operating the unclassified image display area denoted with 41 in FIG. 3. FIG. 4(b) shows the detail of portion A or B of FIG. 4(a) in case of 1000 picture elements (48 pixels) and FIG. 4(c) shows the same in case of 1000 picture elements (100 pixels). FIGS. 5, 6 and 7 show an embodiment of the tabs, denoted with 32 in FIG. 3, for altering the operations.

The instruction image teaching screen in FIG. 3 comprises a navigation panel 32, control panel 31, title panel 30, and information panel 33. The instruction image teaching screen is located under the tab instruction on the information panel 33 which is located beneath "Job" on the navigation panel. "Job" on the navigation panel is called the first hierarchy and the tabs 34 on the information panel is called the second hierarchy. The operation procedure 75 under these tabs are called the third hierarchy. Indication buttons for the instruction image teaching screen are arranged on the third hierarchy.

In the instruction image teaching screen, there is arranged a sub class tree display area 40 on the leftmost side. Then, there are arranged a main class (user class) display map area 41, main class thumbnail display area 42 (first display area), and user class display area 43 (multiple images can be displayed) (second display area) in this order, and there is arranged an image display area 44 (images are displayed in 128 pixels) (third display area) below those screens.

In the sub class tree display area 40, there are arranged sub class display buttons 50, covering the 13 items called the main class (sub class) to be classified by the software automatically, and a switchover button for displaying or not displaying the user classes which are set in the main class by the user. (All classes are displayed under the initial setting.) Picking this button allows to control to display or not display the images in the main class thumbnail display area 42 and user class display area 43. The main class always displays one class only. The displayed content of the main class is maintained as it is until the completion of the operation even if the display is switched to another class.

In the main class (user class) display map area 41, there are arranged blocks of a displayable number of maps 61, each of which represents a single inspection image of the image data which was classified automatically when the inspection image data was loaded by the software. There is also arranged a display area frame 62 which shows the present display location. The frame moves up/down and right/left on each block and the display on the main class thumbnail display area 42 is updated in linkage with the movement.

In the main class thumbnail display area 42, there are so arranged the thumbnail images 51 (48 pixels) of the inspection images that 9 rows×9 columns in the total of 81 of the images can be displayed at a time. The number of images displayed is preferred to be 6×6=36 or more. If there are more than 81 images available, the displayed thumbnail images are updated by moving the frame 62 of the main class (user class) display map area 41 up/down to another block. The displayed thumbnail image can be changed to another by drug & drop operation in each display area.

On the control panel 31, there is provided each button for "File" and "Operation". "Select Data", "Setting Class", "Teaching", and "Selfcheck" are displayed in the tab 34 and the buttons are arranged for each operation.

In the user class display area 43, the thumbnail images are so arranged that 4 classes can be displayed in an area where, for example, each 5 or 6 thumbnail images can be displayed in 2 rows. If the thumbnail images cannot be displayed within the vertical limit of the display area in case that 5 or more user class display areas are provided or 10 or more thumbnail images are available in one class, the display is automatically scrolled.

In the image display area 44, a front image (conventional SEM image), right and left stereoscopic images, and detailed information of the enlarged inspection image are displayed. These enlarged images can be displayed by picking the thumbnail image in the main class thumbnail display area 42 and user class display area 43.

Figure 8:
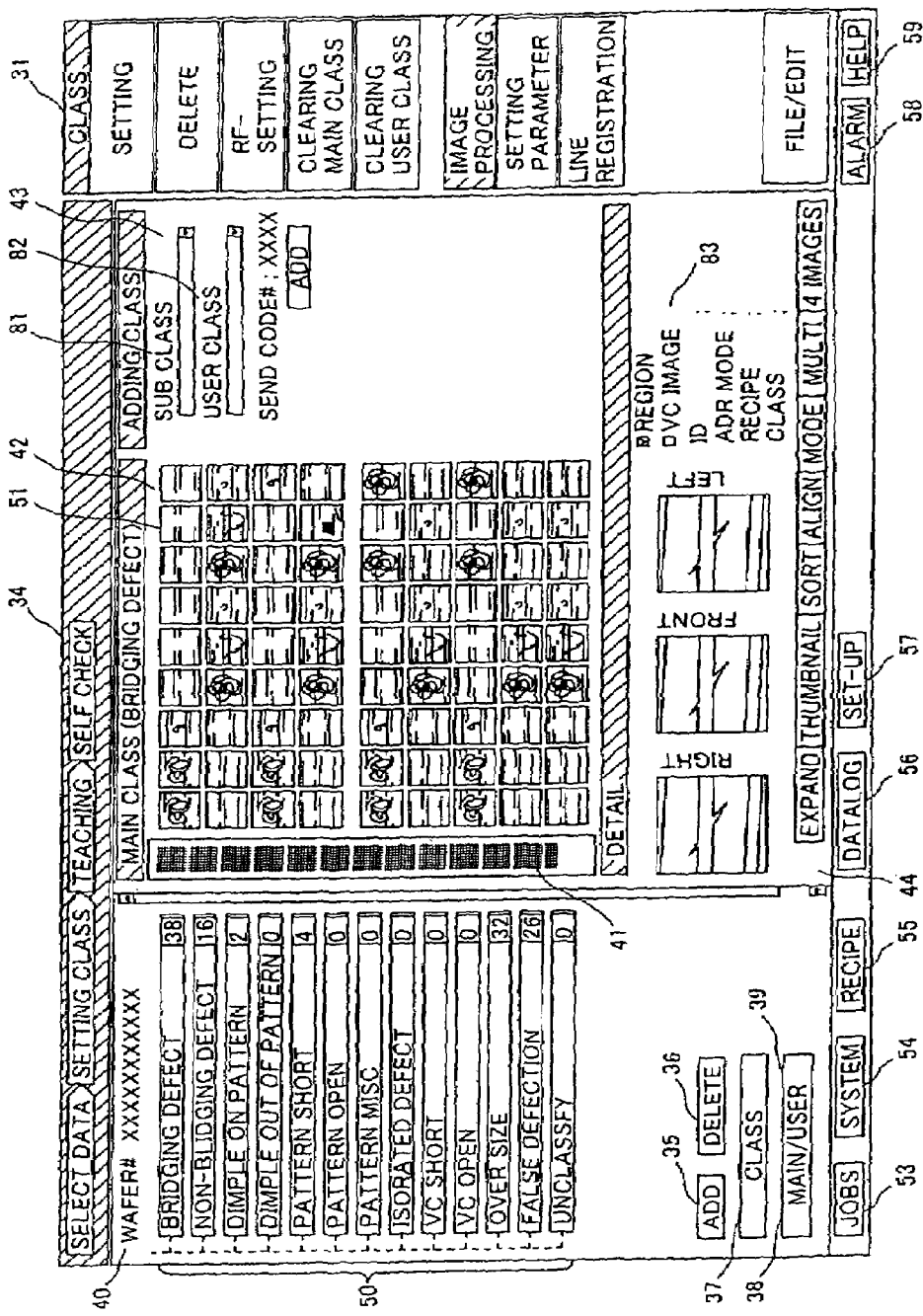
FIG. 8 shows the detail of the screen composition.
Figure 9:
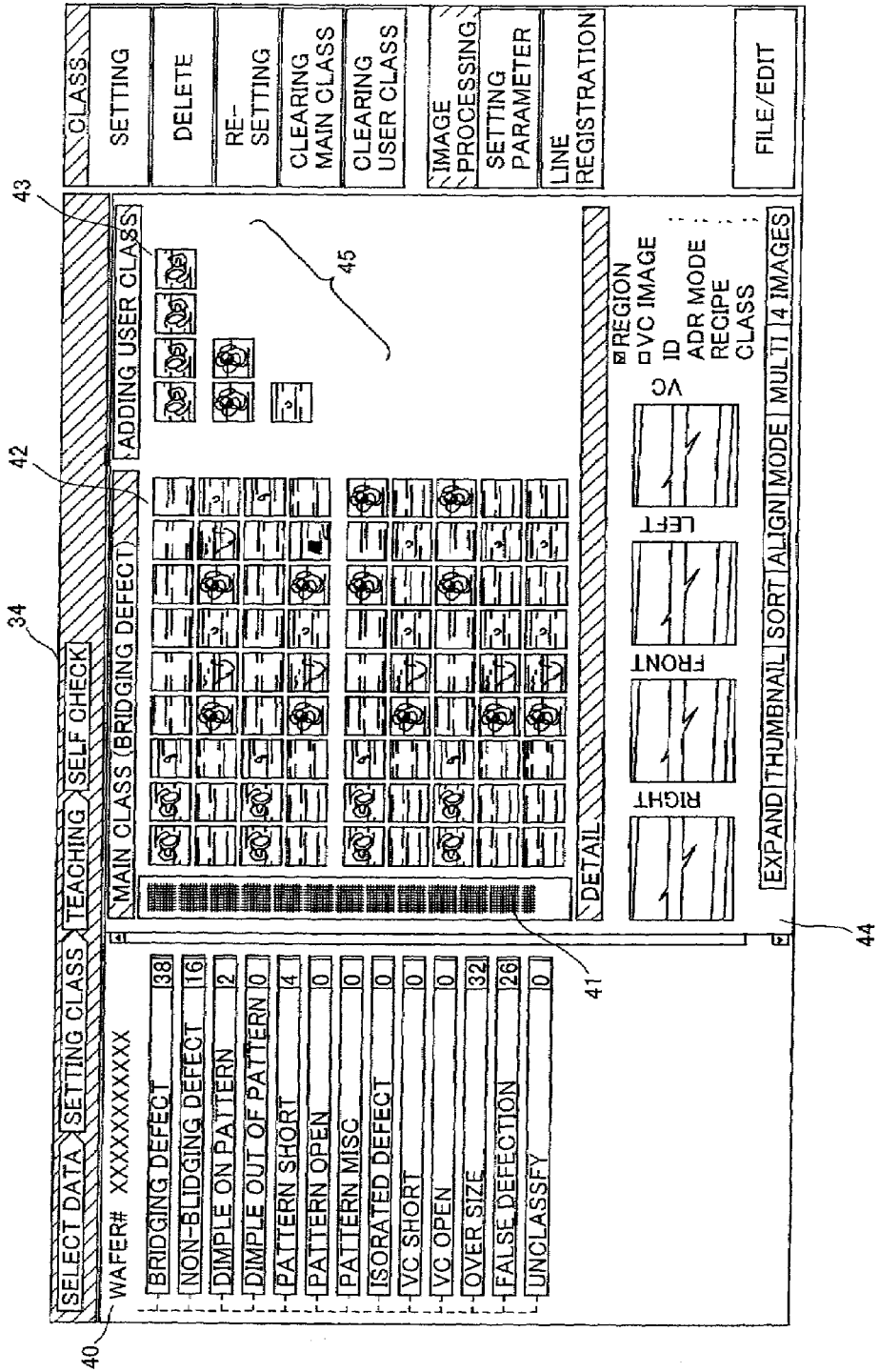
FIG. 9 shows the detail of another screen composition.
Figure 10:
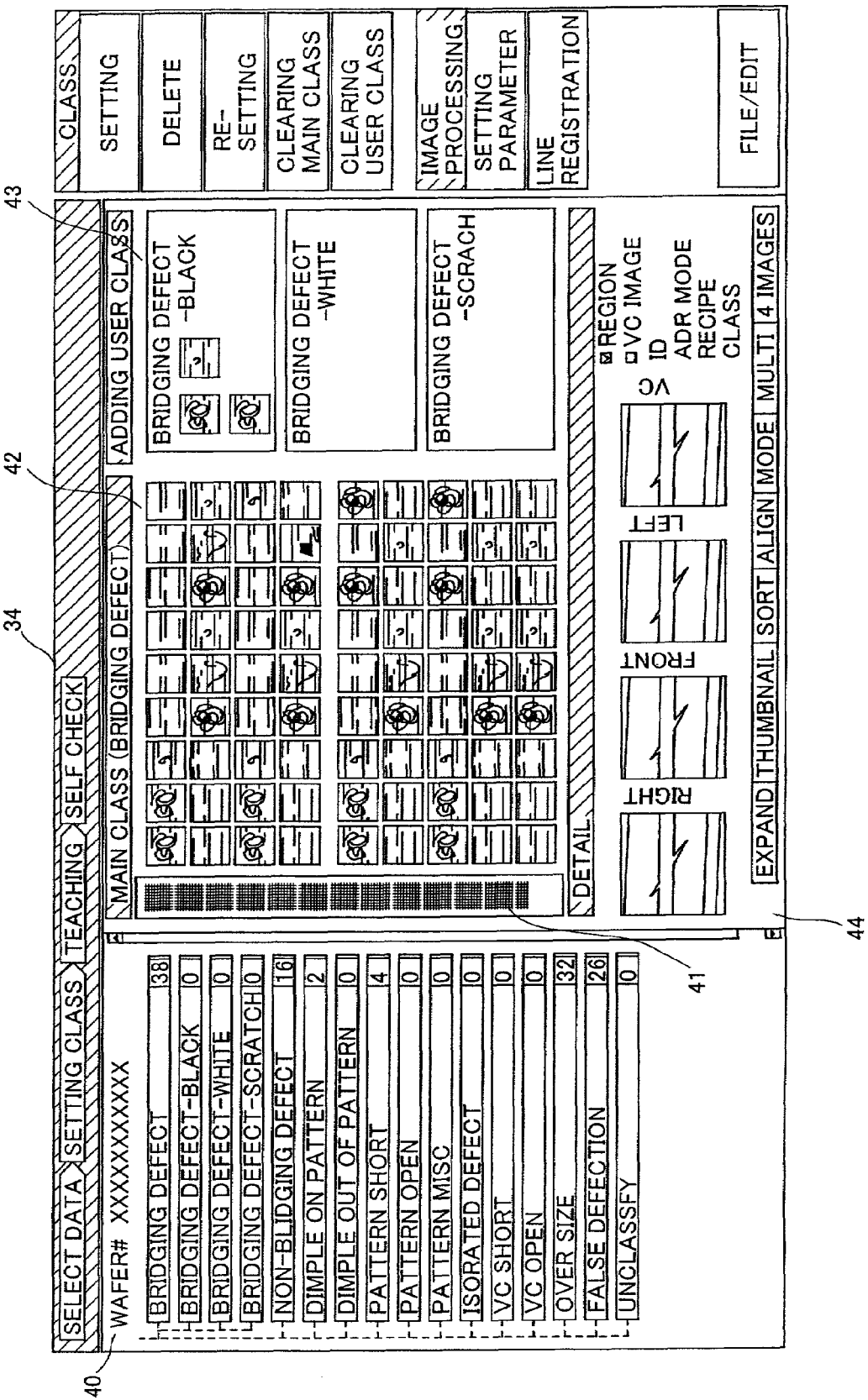
FIG. 10 shows the detail of another screen composition.

FIGS. 8, 9 and 10 shows an example of the display for the classification. FIG. 8 shows a sub class and user class setting screen. In the sub class tree display area 40, the semiconductor wafer # (No.) and 13 classes are displayed, and each class is as shown by the class display buttons 50.

In the sub class tree display area 40, there are also arranged buttons "Add" 35, "Delete" 36, "Class" 37, "Main" 38, and "User" 39. System classification, class addition and detail display can be performed by operating a single button of Class 37. The sub class and user class can be selected by operating the Main 38 and User 39 buttons.

At the bottom of the display screen, there are arranged buttons "Jobs" 53, "System" 54, "Recipe" 55, "Datalog" 56, "Set-up" 57, "Alarm" 58, and "Help" 59.

The Job button 53 is used to open each hierarchy of the classification, System button 54 is used to terminate the system maintenance, Recipe button 55 is used to operate the screen for the classification, Datalog button 56 is used to open the past data, and Set-up button 57 is used to open the initial setting screen. The Alarm button 58 is used to open the past alarm input screen.

In the main class display map area 41, a number of images stored in the storage device are displayed, each as a dot, in 8 or 9 columns by multiple rows. The figure shows the classification by the bridging defect.

In the main class thumbnail display area 42, 9 columns by 9 rows in the total of 81 of the thumbnail images 51 (48 pixels) of the inspection images are displayed at a time. The user class display area 43 is used for an operation to add a user class. In this area, the selected sub class 81 is displayed by operating the class display button 50 and an optional user class 82 is set. The set user class is displayed beneath each sub class column.

In the image display area 44, the right, left and front enlarged images of the selected image are displayed and detail can be checked there (detail display). A VC screen can also be displayed. Besides, on the right of this area, there are arranged "Region", "VC Image", "ID", "ADR Mode", "Recipe", and "Class" buttons 83 for each operation.

Under the image display area 44, there are arranged "Expand", "Thumbnail", "Sort", "Align", "Recipe", "Mode", "Multi", and "Images" buttons 84 for each operation.

When the thumbnail images are displayed and the instruction operation is performed for the user class which is set manually by the user, the images containing the defect falling under the user class are sorted out of the images displayed in accordance with the instruction. Then, by aligning the images, 10 or 12 images 45 in each 5 or 6 rows are displayed as a mass in the user class display area 43. FIG. 9 shows this condition.

The number of the classified images is instructed and displayed in each sub class column or user class column in the sub class tree display area 40. For example, 38 images are classified by the bridging defect.

The SEM image used for the semiconductor inspection is normally obtained and stored in a 512-pixel image size. The classification is performed by observing the image and judging the type and size of the defect and the shape of foreign substance. Even in the selection of the image data under the instruction by the automatic classification software like in this embodiment, it is ideal that the selection is performed in observation of the images of the maximum size, i.e. 512 pixels. At present, however, about 100 inspection images need to be observed for the selection in a single inspection work and it takes a vast amount of time and labor. As the speed of the inspection device will improve in future, it is expected that about 1000 images need to be observed in a single inspection. Under these circumstances, it becomes important to detect a characteristic image out of a great number of inspection images efficiently without using the maximum size images. According to the present invention, since the image size necessary for identifying the characteristic defect image of semiconductors is found to be 48 to 70 pixels and the images are arranged efficiently on the screen, 90 to 100 thumbnail images can be arranged.

The above has been achieved by finding out the smallest possible image size that is capable of minimizing the reloading operation of the screen and yet capable of judging about 70% of the defects on the images in the normal teaching of the instruction images. Thumbnail images of a greater size need to be displayed to further improve the judgment accuracy. This, however, decreases the one-time review capacity and, because a greater number of images are to be reviewed, the screen needs to be scrolled frequently, resulting in the decrease of the classification efficiency. For this reason, a detail display area for reviewing the front, right and left stereoscopic images of 128 pixels all the time is provided on the screen so that the remaining some 30% of the images difficult to classify can be dealt with. The image size of 128 pixels enables to judge about 90% of the defects on the images. Because a 128-pixel detail image can be displayed simply by clicking any 48-pixel image without switching the displayed screen, the review capacity has improved. As a result, the dialog display of the maximum size image of 512 pixels is required only for the minimum number of the images, i.e. 10% or so, resulting in the improved classification efficiency. The size of the image display area used for the teaching of the instruction images is specifically determined because the recognition efficiency normally improves when 5 to 10 images are displayed. The size of the user class display area is set large enough to open 4 areas at the same time because comparison and classification by other user class is necessary. If, however, all user class images are displayed automatically, the screen needs to be scrolled frequently, resulting in the decreased classification efficiency. For this reason, the tree display buttons for all classes are arranged in the tree display area 20 in order to support the operation to display or not display the user classes. If the images of an unnecessary user class are displayed, those are set not to be displayed so as to minimize the scroll of the screen and improve the classification efficiency.

Even with those considerations, the scroll of the display area is inevitable if the number of the inspection images is as much as 1000. As a result, because the control bar of the image location in the relative scrolled display is variable by the number of the images, it sometimes happens that the location of the image under the classification cannot be recognized easily. For the semiconductor inspection images, however, because the map type scroll can be employed by limiting the maximum number of images to some extent, the thumbnail images and map images on the screen can be correlated with each other, and the location in the location information of the image under classification does not vary, the review capacity of the scrolled images improves and the classification efficiency improves.

FIG. 10 shows an example where the bridging defects are classified by "Black", "White", and "Scratch" and displayed in the user class display area corresponding to the display in the sub class tree display area 40 so that the defects are observed more easily. Besides, the VC images in addition to the right, left and front detail images are displayed in the image display area 44.

Figure 11:
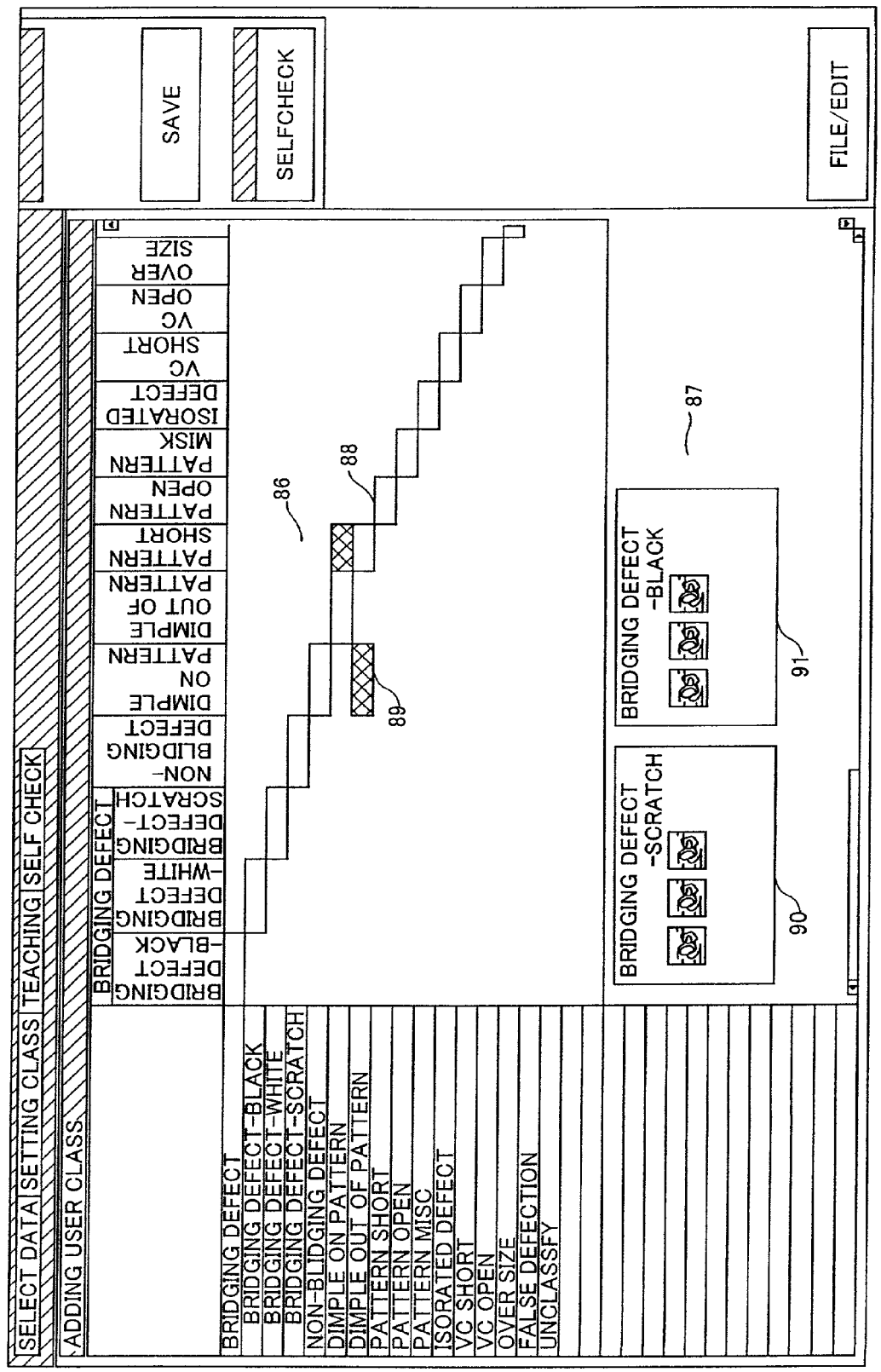
FIG. 11 shows the selfcheck screen.

FIG. 11 shows a selfcheck screen. When the selfcheck button is operated, the screen in FIG. 11 is displayed. The sub classes and the manually set user classes are displayed in the X-axis and Y-axis directions, respectively, and the teaching image data and the actual classification result are displayed as a summary table 86. When the actual classified images conforms to the teaching image data, the check result is displayed at the conforming position 88 which is a frame on the intersection of the X-axis class and the Y-axis class. If they do not conform to each other, however, the displayed result 89 is off the frame. If this happens, the classification is set again by partly changing the instruction images in the teaching. If no conformity is achieved even after the above, the sub classes for the classification are set again. In the instruction selfcheck screen, differences from the instruction test result are clearly displayed in the form of a summary table.

If no conformity is achieved, a screen 90 showing the teaching image data is displayed on the left in a table 87 beneath the summary table 86 and comparatively a screen 91 showing the actual classified image data is displayed on the right. This helps achieve proper classification.

If proper classification cannot be achieved, return to the previous screen by the "setting Class" tab and set the classification again by the "Re-Setting" button. In the re-setting, refer to the previously selected images that are indicated with marking.

Then, the operation is explained hereunder, using the flowchart shown in FIG. 12.

FIG. 12 shows a brief flow of the wafer foreign substance inspection by the REVIEW SEM. It explains a brief procedure of the inspection setting for each process in the semiconductor chip manufacturing processes where an in-process wafer foreign substance inspection is carried out regularly. Since the procedure in each step from S100 to S109 in FIG. 12 is described in detail in the figure, no explanation is made here.

The present invention is so constructed as above that the teaching procedure of the instruction images flows smoothly from the left to the right. First, a main class button to be used for the teaching is picked in the class tree display area on the left of the screen so that it is displayed in the main class thumbnail display area. At the same time, a button for the user class to be used for the classification is picked in a similar manner so as to display it. For different user classes can be displayed in the area (10 thumbnail images are displayed) at the same time so that the scroll of the displayed user classes is minimized by switching to display or not display them in the tree display area.

Then, of the main class thumbnail images displayed, sample inspection images to be used for automatic instruction are taught to the user classes. It is assumed that maximum 1000 to 2000 thumbnail images (the map is displayed in two rows in case of 2000 images) are handled in this operation, and the thumbnail images can be updated freely by moving the map frame 42. Because the display area is maintained by the maps, which is different from ordinary scrolled display, the location of the images in the display area does not vary and accordingly a necessary image can be found out more easily. User reviews a great number of inspection images using the maps and selects a necessary image very quickly. The initial setting of the thumbnail image size is 40 to 50 pixels. This is the smallest size in which the characteristics of the SEM inspection images can be judged, and this size is determined with a consideration that the user's one-time review capacity of the images on the screen can improve and, at the same time, rough teaching up to about 70% of the images can be taught. If the characteristics of the images cannot be judged from the thumbnail images of 48 to 70 pixels, a consideration is so given that the images can be checked smoothly, without opening the dialog, by displaying the image display area always on the bottom of the screen and selecting a thumbnail image. As a result, more than 90% of the images can be judged. If very detailed judgment is needed, the dialog of 512-pixel images is displayed by double-clicking the enlarged image display button and the thumbnail image.

The original location of the taught image on the map is displayed in a white dot and the data is maintained. If even a single image is available for the teaching for the user class, the unclassified images can be sorted and displayed, and the location is maintained as it is on the images displayed after sorting.

In FIG. 5, there is provided, but hidden beneath the tab 24, a tree display of the operation flow as the tree display for reaching the instruction image teaching screen. The difference in the height of the tab means whether hierarchies are hidden beneath the tab. If the tab is selected, the operation tabs beneath the tab appear on the screen. An example 1 in FIG. 6 shows a case where tabs cannot be displayed in a horizontal single line. If lower hierarchies are hidden beyond the right end of the tab, a symbol mark 73 is displayed. The tab is selected by clicking the mark and the operation tabs beneath it appear on the screen at the same time (77 and 58). If the number of the tabs exceeds the width of the screen, the excessive tabs not displayed are stacked toward the right or the left. In FIG. 7, if a tab is selected and operation hierarchies are hidden beneath the tab, an operation display area is reserved for displaying the hierarchies from the left to the right in the sequence of the operation. If complicated operation procedures are hidden beneath a tab as shown in FIGS. 5 to 7, either the procedures are displayed by the tab itself or a special area is reserved for displaying the procedures.

In these embodiments, all elements necessary for the operation are arranged sequentially from the left to the right to show the operation flow clearly so that unnecessary movement or operation of the pointer can be eliminated and that the initial training period can be shortened. Since the size of the thumbnail images used in the teaching of a greater number of inspection images reaching 1000 is initially set to the minimum size of 48 to 70 pixels in which the images can still be judged. With this, 80 to 100 inspection images can be displayed at a time and about 70% of the images can be judged. As a result, the review speed increases and the one-time review capacity for comparison improves. Besides, as a result that an area for displaying a front image and right and left stereoscopic images (128 pixels) of the specified thumbnail image always on the screen is reserved, the efficiency in obtaining the information necessary for the characteristic judgment of the inspection images improves and about 90% of the images can be judged without displaying the 512-pixel dialog, resulting in the increased classification efficiency.

If the thumbnail images are reviewed and a great number of images are handled using the conventional scrolled display, the size and location of the operation bar to be displayed varies depending upon the number of the images. Because of this, it becomes necessary in finding the location of an image that a rough location is first specified and then the screen is moved right and left to confirm the location. When the images are displayed in the form of map, the displayed location does not vary depending upon the number of the inspection images and accordingly the location can be understood visually and specified easily. Since one map is made available for one image and a number of maps that can be displayed on the screen at a time are arranged in a block, the thumbnail image layout can be visually correlated to the maps and hence the location of the images can be understood easily. Besides, in case that the taught images are to be reviewed again, the location of the images can be found out easily because the original location of the images taught in the main class thumbnail display area is maintained and displayed.

Since the processes in each operation are displayed explicitly as the hierarchies beneath the tab 14 appear on the screen, the operation can be understood as a whole and wrong operation can be eliminated. At the same time, the overall scheme of each process can be understood easily. This enables the operator to understand easily where the next function is stored and to minimize his misjudgment in moving to different screens, resulting in the improved operation efficiency and increased speed.

According to these embodiments, "all elements necessary for the operation are arranged sequentially from the left to the right to show the operation flow clearly", "the initial setting of the thumbnail image size is made 40 to 50 pixels, which is the smallest possible size for judging the images, so as to achieve both the one-time review capacity of the inspection images and the operability, and, at the same time, an area for reviewing a front image and right and left stereoscopic images is reserved in the image display area of 128 pixels", and "maps are employed in displaying a great number of the inspection images reaching 1000 maximum so as to improve the review capacity and the display is so set that the teaching of the images is reflected upon the displayed maps". As a result, the operation efficiency can improve in the teaching and judgment operations of about 90% of the images without operating or displaying unnecessary screen and dialog.

As explained above, according to the present invention, users can obtain proper classification and proper data that are suited to their own inspection method because the classes and relevant sub classes of the specimen can be specified. Hence, the present invention can provide an inspection device and inspection method with wide usability.

Also according to the present invention, operation and display of unnecessary screen and dialog can be eliminated in the teaching and judgment operation of 70%, and up to about 90%, of the images and consequently the operation efficiency can improve.

What is claimed is:

1. An inspection device comprising:
   a storage means for storing image data obtained by imaging a specimen,
   a display means for displaying said image data and an operation button,
   an input means for receiving an operation by said operation button, and
   a computer for classifying said image data according to a classification category, wherein
   said computer controls said display means so as to display
   a category hierarchy display area being capable of displaying said classification category of said specimen and a user category (sub class) arbitrarily and selectively set corresponding to said classification category,
   a first display area being capable of displaying plurality of said image data corresponding to said classification category selected by said category hierarchy display area, and a second display area being capable of displaying plurality of said image data corresponding to said user category selected by said category hierarchy display area, and said computer receives a moving operation of said image data from said first display area to said second display area from said input means, and stores said user category in an area where said image data is moved as that of said image data.

2. An inspection device according to claim 1, wherein said second display area displayed on said display means by said computer is capable of displaying plurality of said image data corresponding to said user category selected by said hierarchy display area.

3. An inspection device according to claim 1, wherein said computer controls said display means so as to display a third display area for displaying an enlarged image of said image data by receiving said image data selectively displayed on said first display area through said input means.

4. An inspection device according to claim 2, wherein said enlarged image comprises a right side view, a left side view and a front view of said specimen.

5. An inspection device according to claim 1, wherein said computer controls said display means so as to sequentially display a system category display control MAP area for displaying all images loaded as aggregation of points, and plurality of said image data displayed in said first display area are a part of said all of the imaged data loaded and are sequentially displayed, wherein an identification mark for identifying a range of said first display area is displayed on said system category display control MAP area.

6. An inspection device according to claim 1, wherein said specimen is a semiconductor wafer and said classification category is based on a classification of defects of said semiconductor wafer.

7. An inspection device according to claim 2, wherein said specimen is a semiconductor wafer and said classification category is based on a classification of defects of said semiconductor wafer.

8. An inspection device according to claim 4, wherein said specimen is a semiconductor wafer and said classification category is based on a classification of defects of said semiconductor wafer.

9. An inspection device according to claim 1, wherein size of said image data simultaneously displayed in said first display area is more than 48 pixel and less than 70 pixel per one side.

10. An inspection device according to claim 1, wherein row number of said image data capable of being simultaneously displayed in said first display area is more than 6 and less than 9 pictorial images, and line number of said image data capable of being simultaneously displayed in said first display area is more than 6 and less than 9 pictorial images.

* * * * *